G. C. DAVISON.
LIQUID METER FOR USE WITH OIL WELLS.
APPLICATION FILED MAY 19, 1921.

1,432,593.

Patented Oct. 17, 1922.
2 SHEETS—SHEET 2.

Inventor
Gregory C. Davison
by Wilkinson & Fiesta,
Attorneys.

Patented Oct. 17, 1922.

1,432,593

UNITED STATES PATENT OFFICE.

GREGORY C. DAVISON, OF GROTON, CONNECTICUT.

LIQUID METER FOR USE WITH OIL WELLS.

Application filed May 19, 1921. Serial No. 470,936.

*To all whom it may concern:*

Be it known that I, GREGORY C. DAVISON, a citizen of the United States, residing at Groton, in the county of New London and State of Connecticut, have invented certain new and useful Improvements in Liquid Meters for use with Oil Wells; and I do hereby declare the following to be a full, clear, and exact description of the invention, such as will enable others skilled in the art to which it appertains to make and use the same.

In the production of oil from oil wells, it is important for the operator to know definitely each day the amount of oil which has been pumped from each well. This information is required for two important purposes. First, to assure himself that the pumps are working properly so that he is obtaining the full production of the well; and, second, so as to have an accurate record which will show him the natural decline of the well.

While various meters have been devised for measuring the amount of oil pumped from each well, these meters have been found unsatisfactory in practice for the probable reason that there is a large quantity of gas carried over with the oil from the pump, and the volume of this gas is so great that the ordinary type of displacement meter does not prove reliable at all, as its reading gives the combined volume of oil and gas, the volume being of a variable and indeterminate quantity.

According to my invention means are provided for separating the oil from the gas before the oil is measured, for accurately measuring the oil so separated; and then allowing the oil and gas to be carried away, either to the same or to separate storage tanks, each for further treatment or direct consumption as may be desired.

There are two separate reasons for providing a gas separating device in this oil meter, which can best be understood by a description of the conditions existing in oil wells.

When a well is drilled in an oil producing sand, the oil is forced out of the sand by the exertion of a certain gas pressure. It is the theory of petroleum engineers of the present time that the gas pressure is due to a certain amount of gas dissolved in the oil, consequently the expansion of this gas is what forces the oil out of the sandstone, or rock, consequently a well produces not only oil but a certain amount of gas. This gas is usually termed casing head gas. Especially when a well is first drilled in and the rock pressure is high, the volume of gas is considerable. For example, a well in one of the eastern fields, which normally makes twenty barrels of oil per day on the average, will give off a daily volume of something like thirty to forty thousand feet of gas.

This gas does not come out of the well regularly, but collects in the tubing and in the flow lines leading from the well to the tank. As the oil is pumped up to the top from the bottom of the well, say 1,000 feet deep, the gas rapidly expands and will force a large volume of oil in spurts out of the flow line into the tank or into the meter. These spurts of oil will then be followed by a moderate flow of gas, and later on oil will start to flow gradually and then there will be another spurt. These actions are not at all regular and sometimes very large volumes of oil will come over in one surge. It was to take care of this condition that the oil and gas separating features hereinafter described was provided. The idea being, that one of these spurts of oil would be held in the upper portion of the meter or receiving tank, and would flow through by gravity to the meter, so that although the rate of flow into the meter might be intermittent and irregular, the rate of discharge from the receiving tank would be much more regular.

A second reason for making the change was to prevent a jet of gas from blowing directly onto the measuring device and causing it to dip before it was completely filled. For this reason the gas was prevented from impinging directly on the tilting buckets. This, however, is not so important as the other reason above given, namely, to produce a steadier rate of flow into the measuring buckets.

My invention will be more fully understood after reference to the accompanying drawings, in which like parts are indicated by similar reference symbols throughout the several views, and in which:—

Figure 1:
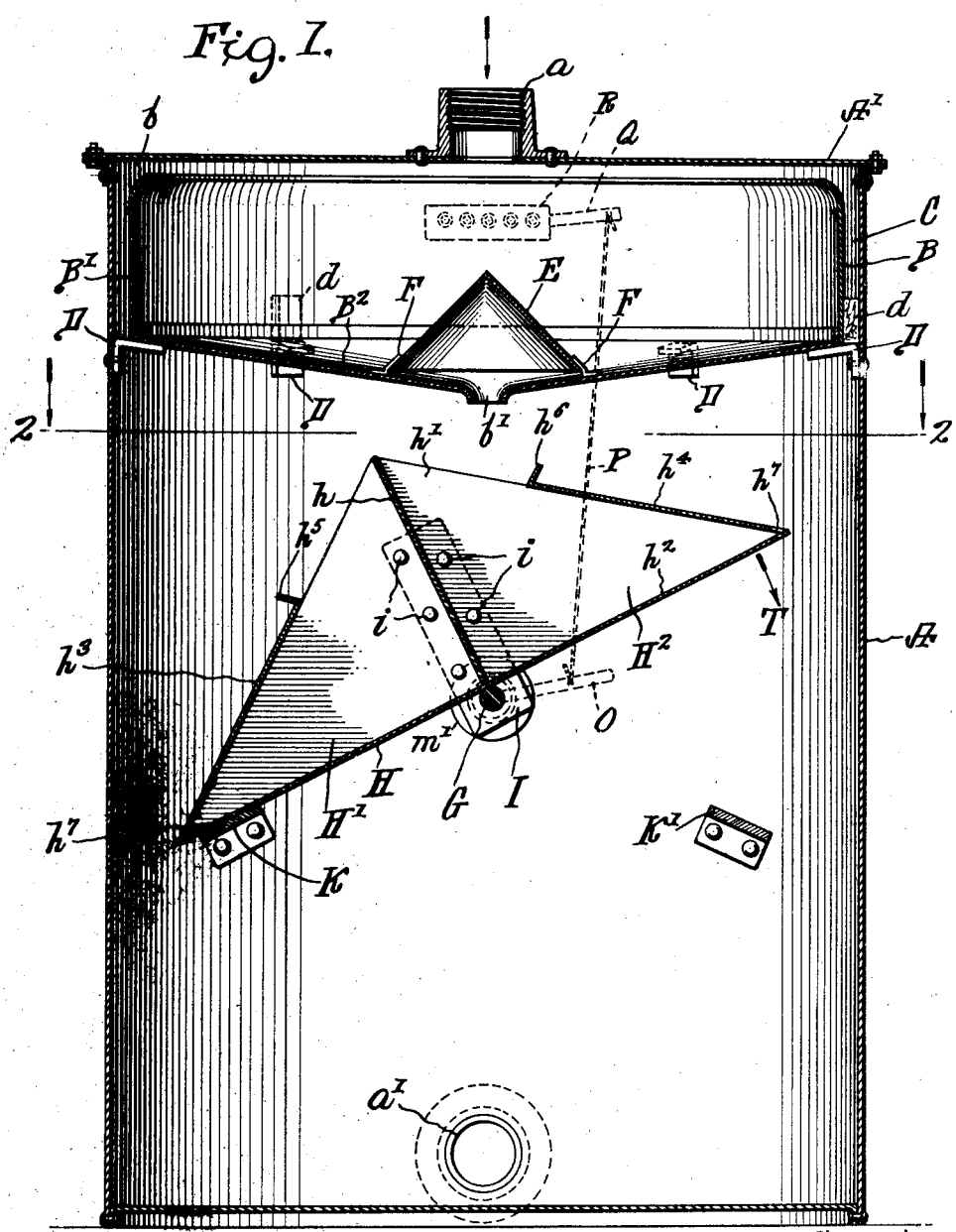
Figure 1 shows a central vertical section through the meter tank, showing the means for separating the gas from the oil and for measuring the oil.

A represents a tank or receptacle, preferably of cylindrical shape and provided with an inlet $a$ for the product from the well, and with one or more outlets $a'$ connected to the receiving tank or reservoir for oil, or gas, or both, not shown. This tank is closed by an airtight head $A'$. Inside of the tank A is the receiving reservoir B which is of less diameter than the tank, and is spaced away therefrom by an annular passage C. This reservoir preferably comprises a cylindrical shell $B'$ curved over at its top, as at $b$, and having its bottom $B^2$ in the form of an inverted frustum of a cone, with a central perforation $b'$. This outlet $b'$ is much smaller than the inlet $a$ for reasons that will be hereinafter stated. This receiving reservoir B rests upon suitable legs D, secured to the inner wall of the tank A. These legs are preferably inclined inwards, as shown in Figure 1, so as to tend to center the bottom $B^2$ of the reservoir B which is preferably removably mounted thereon. If desired three or more suitable spacing blocks $d$ may be provided so as to center the outer wall of the reservoir B relative to the inner wall of the tank A, and thus provide a uniform radial width to the annular passage C.

Mounted above the orifice $b'$, and spaced away therefrom, is the deflecting cone E which is secured to and spaced away from the bottom $B^2$ in any convenient way, as by means of the legs F.

The top of the reservoir B should be spaced slightly below the head $A'$ of the tank A so that any gas rising from the reservoir may flow down through the annular passage C.

Mounted directly below the orifice $b'$ is the rock shaft G, to which the meter box H is rigidly attached as by means of the brackets I and bolts $i$ (see Fig. 1). This meter box H is preferably triangular in cross section, and is provided with a central web $h$ separating the box into two equal chambers $H'$ and $H^2$; the ends $h'$ of the meter box being in the form of triangular plates, and the bottom $h^2$ being preferably plane. The sides $h^3$ and $h^4$ preferably terminate in the flanges $h^5$ and $h^6$, leaving openings in the top of the box between said flanges and the web plate $h$, through which openings the liquid from orifice $b'$ falls.

At each lower edge of the box an elongated opening or slot $h^7$ is provided, through which the liquid contents of the lower chamber of the meter box are free to flow, and the opposite slot $h^7$ is in the raised position as shown in Figure 1.

Figure 2:
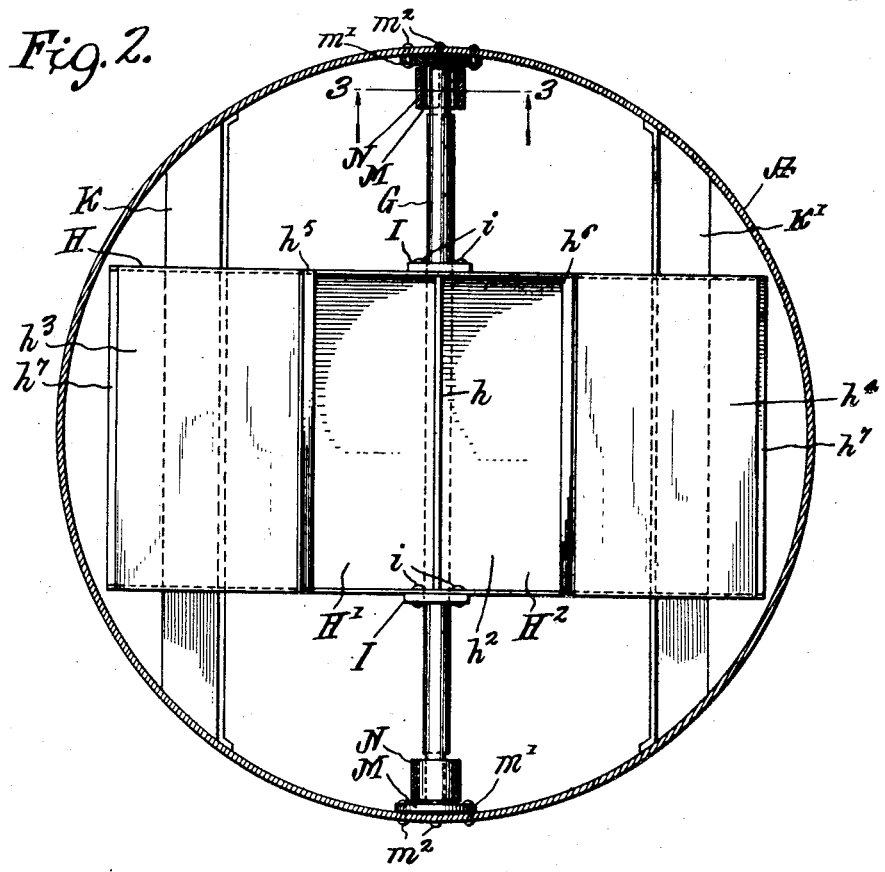
Figure 2 shows a section along the line 2—2 of Figure 1, and looking down, one of the rock shaft bearings being also shown in section.

The rocking motion of the shaft G, and of the meter box carried thereby, is controlled by the fixed stops K and $K'$, preferably in the form of metal strips secured across cords of the inner wall of the tank and set at an angle, as shown in Figures 1 and 2. To lessen friction the rock shaft G is preferably provided near its ends with knife bearings $g$, like those found in chemists' scales, which engage in notches $m$ of the bearing blocks M, which are secured to the inner wall of the tank in any convenient way, as by means of the flanges $m'$ and bolts $m^2$, passing through the bolt holes $m^0$.

Figure 3:
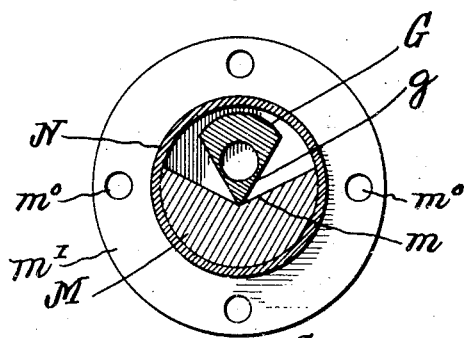
Figure 3 shows a section along the line 3—3 of Figure 2 and looking in the direction of the arrows, the parts being shown on a larger scale than in Figure 2.

In order to prevent the knife bearings from becoming displaced by any accidental shock, as is liable to occur when the meter box is suddenly rocked from one position to the other, I provide an enclosing sleeve N which slips over the cylindrical portion of the bearing block M and is normally clear of the top of the shaft G, as shown in Figure 3. This sleeve may be moved in or out of the shaft G when it is desired to assemble or disassemble the parts.

The number of vibrations of the meter box may be registered in any convenient way, as by any well known counter system connected to or operated by the shaft G, such as is indicated in dotted lines in Figure 1, in which O represents an arm connected by the rod P to the arm Q actuating the counting and registering mechanism R. Any of the ordinary counting devices, such as are used in street cars, automobiles, or the like, may be used, and I make no special claim to the counting mechanism which is merely indicated diagrammatically herein.

The operation of the device is as follows:—

The mixed oil and gas enter through the inlet $a$ directly above the deflector cone E. The gas carried along with or generated in the liquid tends to rise up in the reservoir B and overflow into the annular space C, and to pass down under pressure into the tank A, and is carried off through the outlet $a'$. The liquid contents tend to settle in the bottom of the reservoir, and, flowing down the inclined bottom $B^2$, pass through the space beneath the bottom of the cone E, and flow through the small orifice $b'$ into one of the two chambers of the meter box H. By having the outlet $b'$ much smaller than the inlet $a$ sudden rushes of mixed gas and oil may freely and intermittently enter at $a$, while a continuous flow of liquid substantially free from gas may be had through the outlet $b'$. The gas flows upwards around the edge $b$ and downwards through the annular passage C into that portion of the chamber A above the liquid contents in the bottom thereof. The liquid is practically free from imprisoned gas by the time it reaches the meter box, so that whatever is measured by that box will be practically all liquid.

Assuming the parts to be in the initial position shown in Figure 1, the meter box and stops K and K' are so arranged that the empty chamber, such as H', will remain in the downwardly inclined position until the raised chamber, such as H², is nearly or not quite full of liquid, and when this point is reached the center of gravity of the box will be shifted by the inflowing oil so as to cause the box to tilt in the direction indicated by the arrow T in Figure 1, causing the chamber H² to fall to the lowered position, and its bottom to bring up against the stop K', when the liquid will flow out through the corresponding lower opening $h^7$, and the chamber H' will be in the raised position ready to receive the liquid from the orifice $b'$.

As soon as the chamber H' becomes filled, the chamber H² having in the meantime become empty, the box will tilt again to the initial position shown in Figure 1, and this operation will be continued indefinitely.

Having determined by experiment, or otherwise, the quantity of inflowing liquid that is required to tip each chamber of the meter box from the raised to the lowered position, it will be a very simple matter to determine the total volume of liquid that passes through the meter box by any suitable counting apparatus which will count the number of shifts of the meter box. As before described there are many varieties of such counting apparatus which could be used to indicate the number of vibrations of the rock shaft G during any time interval.

Thus it will be seen that the device is absolutely automatic in its operation, does not require any attention except possibly to read the meter and occasionally set same. Should any of the parts become clogged up, or need inspection or repair, the said parts may be easily inspected and removed by taking off the head A' and removing the reservoir B, then sliding the sleeves N inwards and lifting out the shaft G and the meter box carried thereby.

It will be obvious that various modifications might be made in the herein described apparatus, and in the construction, combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. Apparatus of the character described, comprising a closed tank provided with an inlet for the product from the well and an outlet for same, a cylindrical receiving reservoir provided with a funnel shaped bottom perforated at the center and provided with a central deflector spaced above said perforation, the periphery of said reservoir being spaced away from the inner walls of said tank, for separating the oil from the gas located in the upper part of the tank, and an oscillating meter box mounted below said separating means and provided with a pair of chambers adapted to be filled and emptied alternatively, with means for registering the number of oscillations of said box, substantially as described.

2. Apparatus of the character described, comprising a closed tank provided with an inlet for the product of the well and an outlet for same, a cylindrical receiving reservoir provided with a funnel shaped bottom perforated at the center and provided with a central deflector spaced above said perforation, the periphery of said reservoir being spaced away from the inner walls of said tank, for separating the oil from the gas located in the upper part of the tank, and an oscillating meter box mounted below said separating means and provided with a pair of chambers adapted to be filled and emptied alternatively, stops on the interior of said tank for limiting the vibratory movement of said meter box, with means for registering the number of oscillations of said box, substantially as described.

3. Apparatus of the character described, comprising a closed tank provided with an inlet for the product from the well and an outlet for same, a cylindrical receiving reservoir provided with a funnel shaped bottom perforated at the center and provided with a central deflector spaced above said perforation, the periphery of said reservoir being spaced away from the inner walls of said tank, for separating the oil from the gas located in the upper part of the tank, and an oscillating meter box mounted below said separating means and provided with a pair of chambers adapted to be filled and emptied alternatively, substantially as described.

4. Apparatus of the character described, comprising a closed tank provided with an inlet for the product from the well and an outlet for same, a cylindrical receiving reservoir provided with a funnel shaped bottom perforated at the center and provided with a central deflector spaced above said perforation, the periphery of said reservoir being spaced away from the inner walls of said tank, for separating the oil from the gas located in the upper part of the tank, and an oscillating meter box mounted below said separating means and provided with a pair of chambers adapted to be filled and emptied alternately, stops on the interior of said tank for limiting the vibratory movement of said meter box, substantially as described.

5. Apparatus for use in measuring the liquid delivered from oil wells, comprising a closed tank provided with an inlet for the product from the well and an outlet for same, a fixed member for separating the oil from the gas, and an oscillating meter box mounted below said separating means and provided with a pair of chambers adapted to be filled and emptied alternatively, with means for registering the number of oscillations of said box, substantially as described.

6. Apparatus for use in measuring the liquid delivered from oil wells, comprising a closed tank provided with an inlet for the product from the well and an outlet for same, a fixed member for separating the oil from the gas, and an oscillating meter box mounted below said separating means and provided with a pair of chambers adapted to be filled and emptied alternatively, stops on the interior of said tank for limiting the vibratory movement of said meter box, with means for registering the number of oscillations of said box, substantially as described.

7. Apparatus of the character described for use with oil wells, comprising a closed tank provided with an inlet for the product from the well and an outlet for same, a rock shaft, provided with knife edge bearings, journaled transversely of said tank and located below said inlet, an oscillating meter box fixed to said rock shaft and provided with a pair of chambers adapted to be filled and emptied alternatively, and a fixed member located above said meter box and adapted to separate the gas from the liquid, substantially as described.

8. Apparatus of the character described for use with oil wells, comprising a closed tank provided with an inlet for the product from the well and an outlet for same, a rock shaft, provided with knife edge bearings, journaled transversely of said tank and located below said inlet, and an oscillating meter box fixed to said rock shaft and provided with a pair of chambers, adapted to be filled and emptied alternatively, and a fixed member located above said meter box and adapted to separate the gas from the liquid, and means operated by said rock shaft for registering the number of oscillations of said box, substantially as described.

9. Apparatus of the character described for use in oil wells, comprising a closed tank provided with an inlet for the product from the well and an outlet for same, an oscillating meter box mounted below said inlet and provided with a pair of chambers adapted to be filled and emptied alternatively, a fixed member for separating the gas from the oil located above said meter box, and means for registering the number of oscillations of said box, substantially as described.

10. Apparatus of the character described for use in oil wells, comprising a closed tank provided with an inlet for the product from the well and an outlet for same, and an oscillating meter box mounted below said separating means and provided with a pair of chambers adapted to be filled and emptied alternatively, a fixed member for separating the gas from the oil located above said meter box, stops on the interior of said tank for limiting the vibratory movement of said meter box, and means for registering the number of oscillations of said box, substantially as described.

GREGORY C. DAVISON.